(12) United States Patent
Ma et al.

(10) Patent No.: US 7,875,226 B2
(45) Date of Patent: Jan. 25, 2011

(54) METHOD OF MAKING AN ARMREST AND THE ARMREST MADE THEREBY

(75) Inventors: Ping-Hui Ma, Kaohsiung Hsien (TW); Yu-Lung Chen, Kaohsiung (TW); Ching-Kun Lee, Kaohsiung Hsien (TW)

(73) Assignee: Advanced International Multitech Co., Ltd., Kaohsiung (TW)

( * ) Notice: Subject to any disclaimer, the term of this patent is extended or adjusted under 35 U.S.C. 154(b) by 182 days.

(21) Appl. No.: 12/220,179

(22) Filed: Jul. 21, 2008

(65) Prior Publication Data
US 2009/0152911 A1 Jun. 18, 2009

(30) Foreign Application Priority Data
Dec. 17, 2007 (TW) .............................. 96148225 A

(51) Int. Cl.
- B29C 45/14 (2006.01)
- B28B 5/00 (2006.01)
- B27N 3/10 (2006.01)
- A47C 13/00 (2006.01)
- A47C 27/00 (2006.01)
- B60R 13/00 (2006.01)

(52) U.S. Cl. .................. 264/257; 264/250; 264/251; 264/258; 264/259; 264/261; 264/262; 264/263; 264/265; 264/267; 264/269; 264/271.1; 297/11; 297/188.18; 297/188.2; 297/227; 297/287; 297/288; 297/297; 297/411.1; 296/24.34

(58) Field of Classification Search ............... D12/421; 297/11, 297, 188.18, 188.2, 227, 287, 288, 297/411.1; 296/24.34; 264/250, 251, 257, 264/258, 259, 261, 262, 263, 265, 267, 269, 264/271.1

See application file for complete search history.

(56) References Cited

U.S. PATENT DOCUMENTS

| | | | | | |
|---|---|---|---|---|---|
| 2,524,659 A | * | 10/1950 | Gorman | .............. | 297/411.24 |
| 2,524,909 A | * | 10/1950 | Hines | .............. | 312/235.6 |
| 3,068,048 A | * | 12/1962 | Mahon et al. | .......... | 297/188.15 |
| D199,975 S | * | 1/1965 | Riedel | .............. | D12/421 |
| D252,540 S | * | 8/1979 | Murphy | .............. | D12/419 |
| D257,914 S | * | 1/1981 | Wooters | .............. | D12/419 |
| D267,444 S | * | 1/1983 | Ruxton | .............. | D12/419 |
| D304,263 S | * | 10/1989 | Mull | .............. | D12/419 |
| D345,648 S | * | 4/1994 | Favilla | .............. | D12/421 |
| D358,124 S | * | 5/1995 | Landry | .............. | D12/423 |
| D359,266 S | * | 6/1995 | Karp et al. | .............. | D12/419 |

(Continued)

*Primary Examiner*—Christina Johnson
*Assistant Examiner*—Atul Khare
(74) *Attorney, Agent, or Firm*—David N. Lathrop

(57) ABSTRACT

A method of making an armrest that is mountable between adjacent left and right passenger seats includes: separately forming two receptacle parts by molding a prepreg in a first mold assembly, the receptacle parts being adapted to hold personal objects and each having a looped wall surrounding a slot; forming an armrest frame by molding a prepreg in a second mold assembly, the armrest frame including a lower frame portion having a plurality of downwardly extending legs, and an upper frame portion disposed on top of and bridging the legs; and positioning the receptacle parts within the second mold assembly and combining the receptacle parts with the upper frame portion during the forming of the armrest frame in the second mold assembly, thereby providing a one-piece unitary structure having the receptacle parts and the armrest frame.

7 Claims, 10 Drawing Sheets

U.S. PATENT DOCUMENTS

| | | | |
|---|---|---|---|
| D368,890 S * | 4/1996 | Morris | D12/419 |
| 5,527,571 A * | 6/1996 | Brugel | 427/333 |
| D374,856 S * | 10/1996 | Berninger | D12/419 |
| D375,480 S * | 11/1996 | Smith | D12/419 |
| D376,924 S * | 12/1996 | Beaulieu | D6/366 |
| D390,530 S * | 2/1998 | Robinson | D12/421 |
| D391,223 S * | 2/1998 | Lucas, Jr. | D12/424 |
| 5,756,189 A * | 5/1998 | Nagano et al. | 428/198 |
| D397,083 S * | 8/1998 | Smith | D12/419 |
| D399,483 S * | 10/1998 | Paredes, Jr. | D12/424 |
| D411,980 S * | 7/1999 | Sacco et al. | D12/425 |
| 6,033,013 A * | 3/2000 | Lee | 297/115 |
| D430,104 S * | 8/2000 | McDonald | D12/419 |
| D430,535 S * | 9/2000 | Smith | D12/419 |
| D431,944 S * | 10/2000 | Cazarez et al. | D6/501 |
| D432,076 S * | 10/2000 | Stickles et al. | D12/419 |
| D434,365 S * | 11/2000 | Herer et al. | D12/415 |
| D434,720 S * | 12/2000 | Haack et al. | D12/419 |
| 6,343,835 B1 * | 2/2002 | Ledbetter | 297/188.2 |
| 6,591,787 B1 * | 7/2003 | Gantz et al. | 119/771 |
| D495,989 S * | 9/2004 | Kohara | D12/424 |
| D502,910 S * | 3/2005 | Klopp et al. | D12/421 |
| 6,932,402 B2 * | 8/2005 | Niwa et al. | 296/24.34 |
| D585,674 S * | 2/2009 | Bennett | D6/501 |
| D598,362 S * | 8/2009 | Tan et al. | D12/415 |
| 2002/0066392 A1 * | 6/2002 | Calam et al. | 108/33 |
| 2005/0082861 A1 * | 4/2005 | Kubota et al. | 296/24.34 |
| 2005/0140157 A1 * | 6/2005 | Emerling | 296/24.34 |

* cited by examiner

METHOD OF MAKING AN ARMREST AND THE ARMREST MADE THEREBY

CROSS-REFERENCE TO RELATED APPLICATION

This application claims priority of Taiwanese Application No. 096148225, filed on Dec. 17, 2007.

BACKGROUND OF THE INVENTION

1. Field of the Invention

The invention relates to a method of making an armrest, more particularly to a method of making an armrest that is mountable between adjacent left and right passenger seats. The invention also relates to the armrest made by the method.

2. Description of the Related Art

In order to provide ergonomic comfort for passengers and to provide multi-functional spaces for mounting beverage holders, sockets for electronic devices, etc., an armrest for a seat of a transport vehicle usually has a complicated structure. Therefore, the conventional armrest is not formed integrally.

Japanese Patent Publication No. 56-121740 discloses an armrest which is made by: fitting a foamed synthetic resin sheet to a female-type vacuum molding die and subjecting the foamed synthetic resin sheet to vacuum molding to obtain two foamed skins having a U-shaped cross section; applying a bonding agent on inside surfaces of the skins to form bonding agent layers; inserting the skins into the inside of right and left hollow molding metal dies; introducing a parison into the dies; closing the dies; and expanding the parison by blowing air from a blow-in port to integrate the parison with the skins so as to obtain a hollow armrest.

Since the aforesaid method is only suitable for making an armrest having a relatively simple configuration, an armrest having a relatively complicated configuration is usually made by manufacturing the various molded parts of the armrest, followed by assembling the molded parts together using any suitable assembling means, for example, by screw fasteners. Therefore, the conventional method is complicated and costly, precise assembly of the molded parts is relatively difficult, and the armrest made thereby has a relatively weak mechanical strength.

SUMMARY OF THE INVENTION

Therefore, the object of the present invention is to provide a method of making an armrest which has an integrally formed structure.

In one aspect of this invention, a method of making an armrest that is mountable between adjacent left and right passenger seats includes:

separately forming two receptacle parts by molding a prepreg in a first mold assembly, the receptacle parts being adapted to hold personal objects and each having a looped wall surrounding a slot;

forming an armrest frame by molding a prepreg in a second mold assembly, the armrest frame including a lower frame portion having a plurality of downwardly extending legs, and an upper frame portion disposed on top of and bridging the legs; and positioning the receptacle parts within the second mold assembly and combining the receptacle parts with the upper frame portion during the forming of the armrest frame in the second mold assembly, thereby providing a one-piece unitary structure having the receptacle parts and the armrest frame.

In another aspect of this invention, an armrest mountable between two adjacent left and right passenger seats includes an armrest frame and two receptacle parts. The armrest frame includes a lower frame portion having a plurality of downwardly extending legs, and an upper frame portion disposed on top of and bridging the legs. The upper frame portion has a partition plate. The receptacle parts are disposed in the upper frame portion and respectively have looped walls each of which surrounds a slot. The looped walls are disposed on left and right sides of the partition plate. The slots of the receptacle parts open at left and right sides of the upper frame portion. The receptacle parts and the armrest frame constitute a unitary one-piece molded structure made of a prepreg, and the receptacle parts are adapted to hold personal objects.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
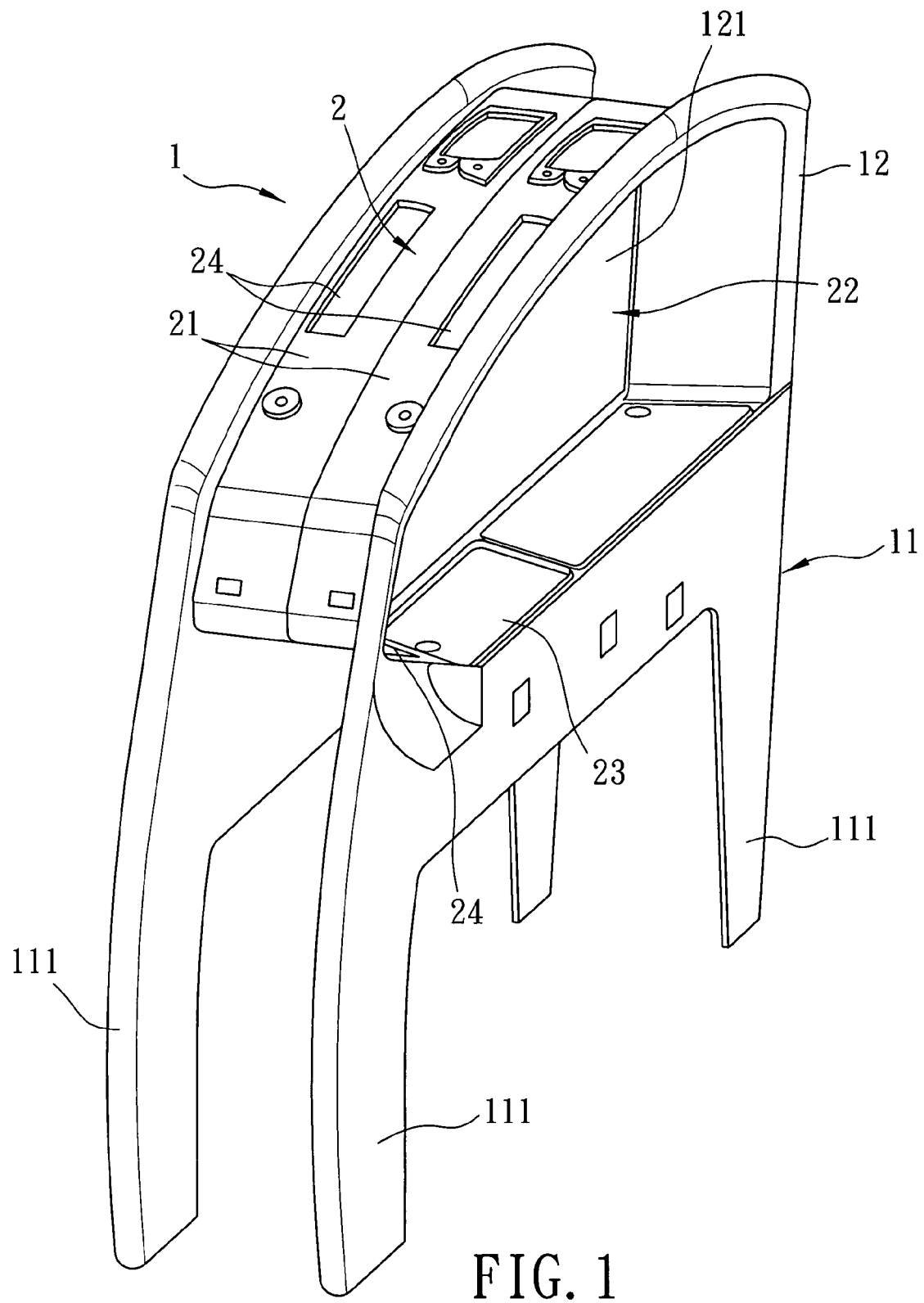
FIG. 1 is a perspective view of the preferred embodiment of an armrest according to this invention.
Figure 2:
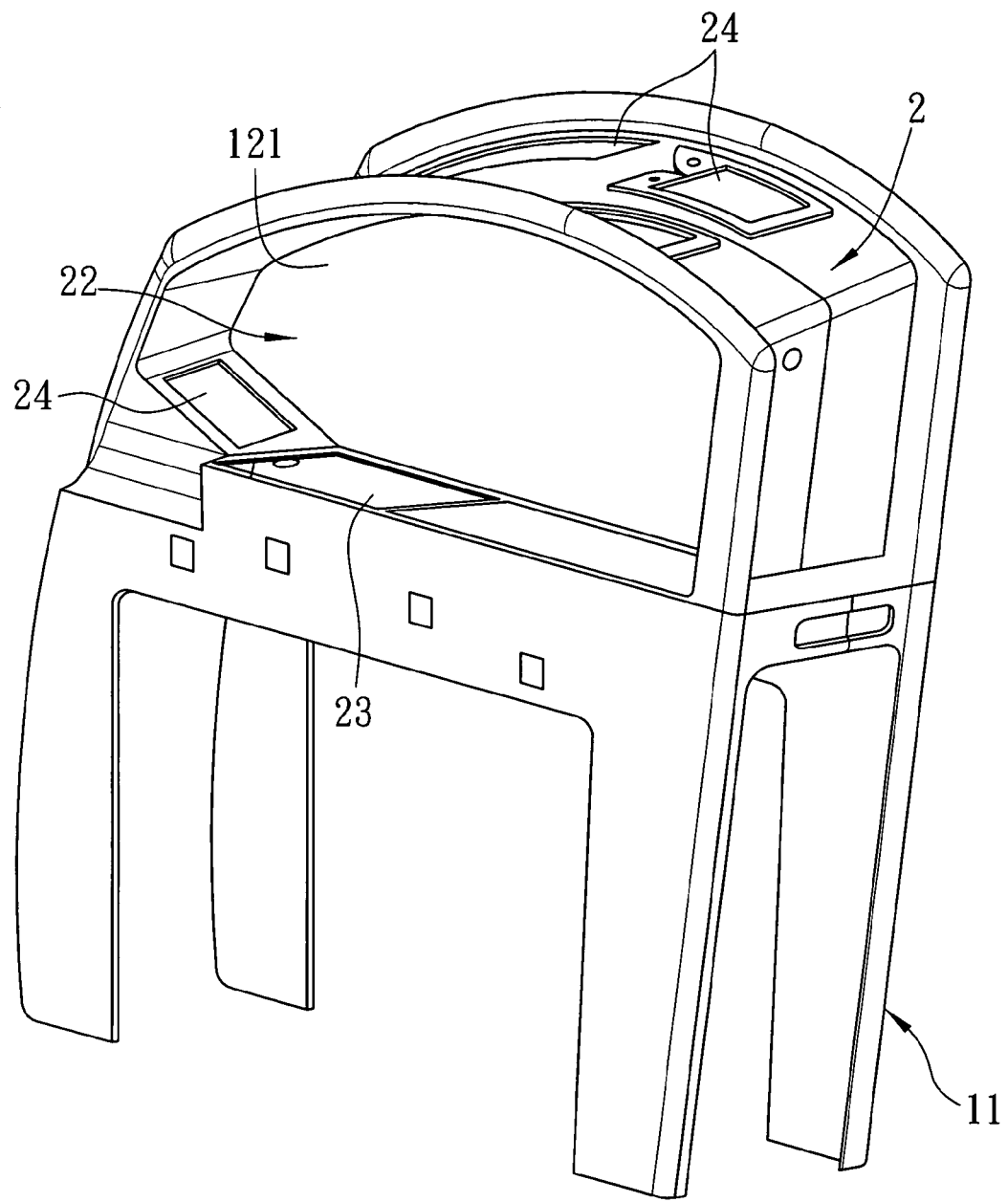
FIG. 2 is another perspective view of the preferred embodiment.

Referring to FIGS. 1 and 2, the preferred embodiment of the armrest according to this invention is mountable between adjacent left and right passenger seats (not shown), and includes an armrest frame 1 and two receptacle parts 2. Preferably, the armrest frame 1 and the receptacle parts 2 are made of a carbon fiber material in view of the lightweight characteristics of the material.

The armrest frame 1 includes a lower frame portion 11 having a plurality of downwardly extending legs 111, and an upper frame portion 12 disposed on top of and bridging the legs 111. The upper frame portion 12 has a partition plate 121. The legs 111 of the lower frame portion 11 include a pair of spaced apart left legs 111, and a pair of spaced apart right legs 111 which are spaced apart from the left legs 111.

The receptacle parts 2 are disposed in the upper frame portion 12 and respectively have looped walls 21 each of which surrounds a slot 22. The looped walls 21 are disposed on left and right sides of the partition plate 121. The slots 22 of the receptacle parts 2 open at left and right sides of the upper frame portion 12.

The receptacle parts 2 and the armrest frame 1 constitute a unitary one-piece molded structure made of a prepreg. The receptacle parts 2 are formed with a plurality of openings 24 adapted for mounting a passenger service unit, a headset socket, a lamp switch, or the like, and a plurality of recesses 23 adapted to hold personal objects, such as a cellular phone.

Figure 3:
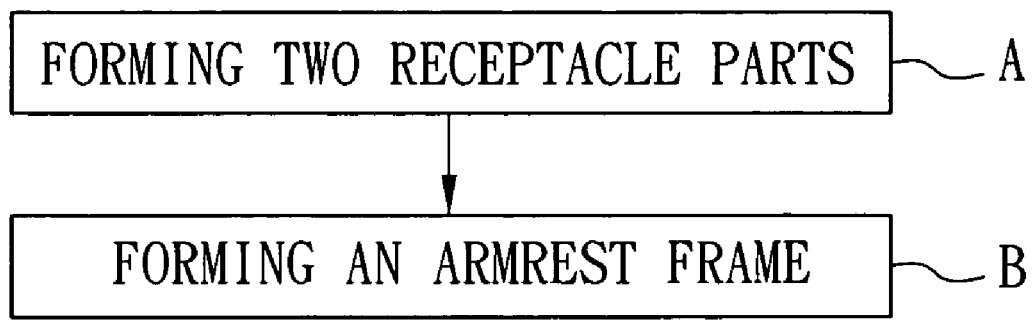
FIG. 3 is a flow diagram of the preferred embodiment of a method of making an armrest according to this invention.
Figure 4:
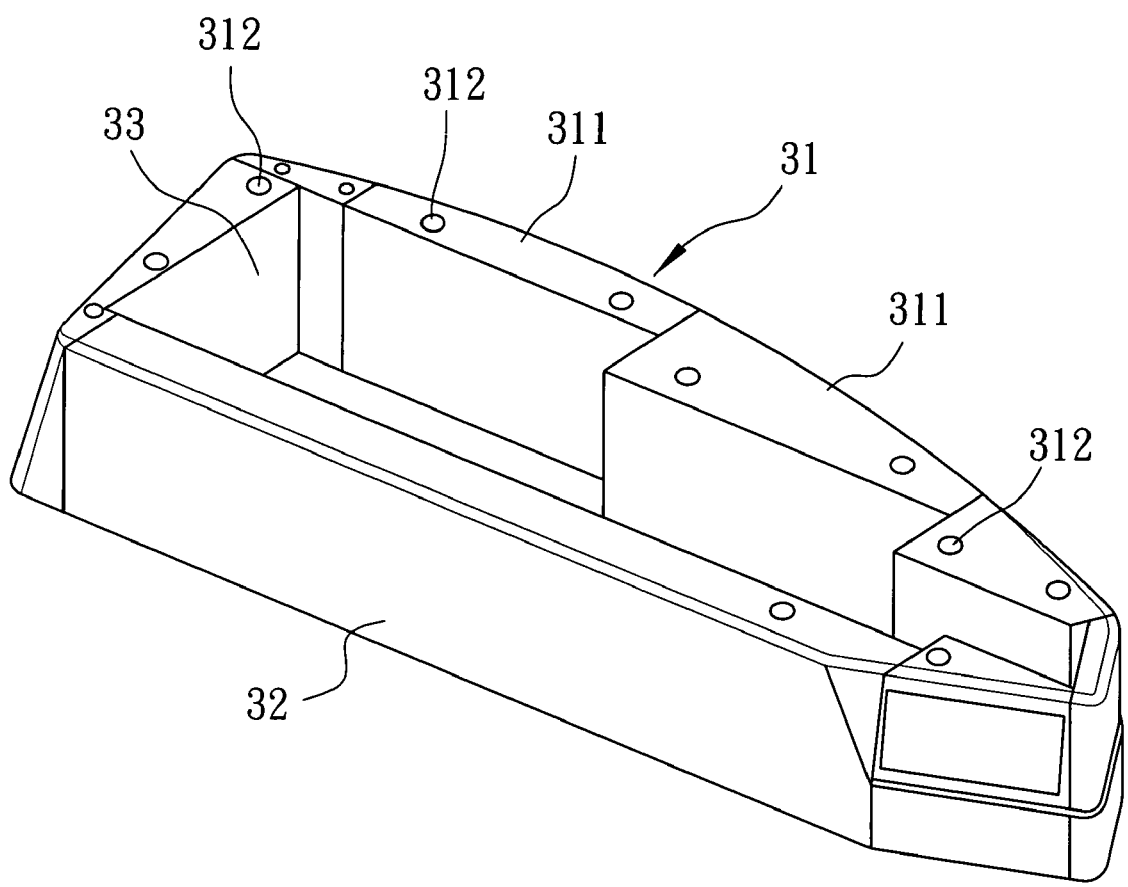
FIGS. 4 to 11 are views showing consecutive steps of the method of the preferred embodiment.
Figure 5:
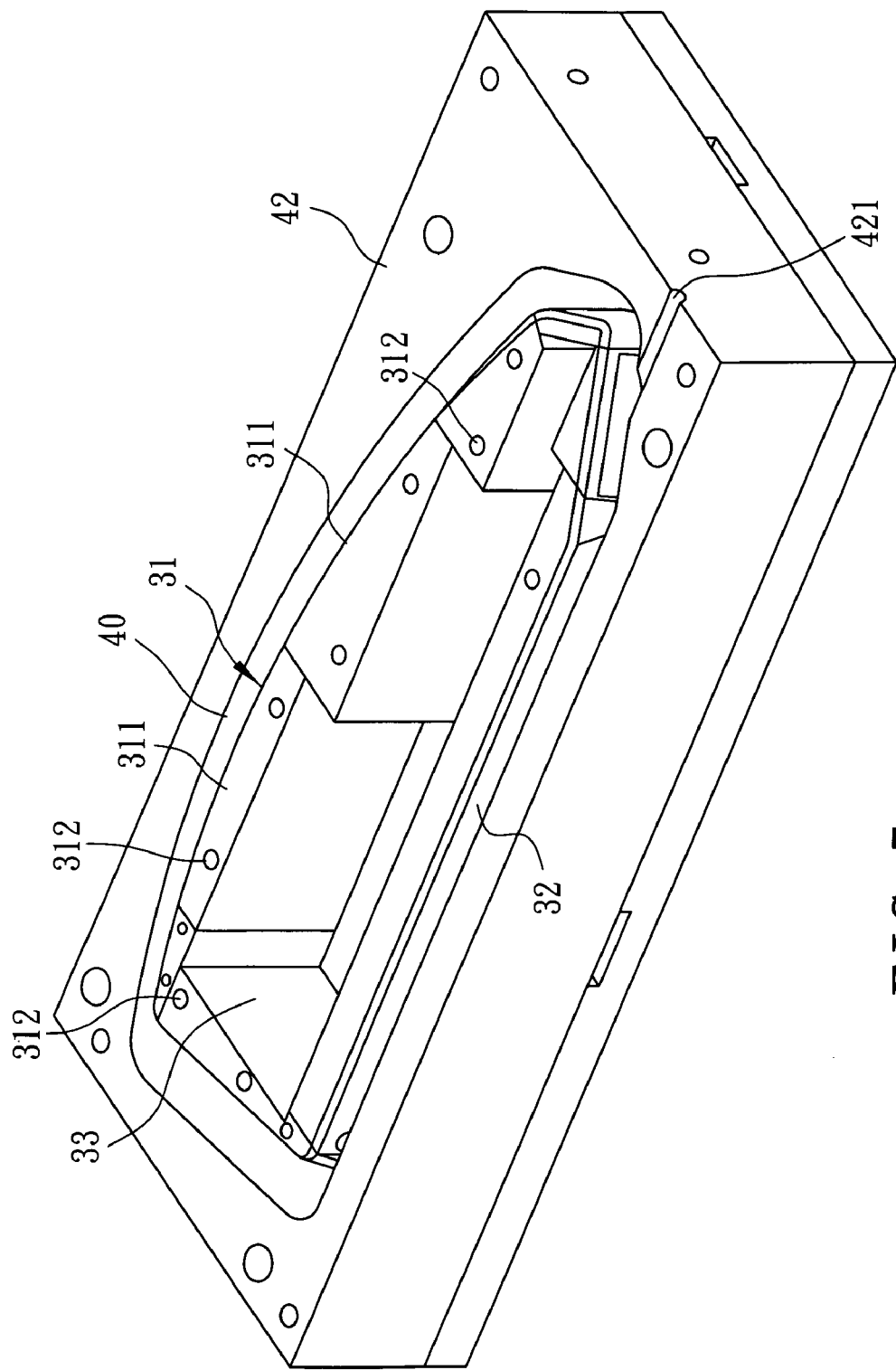
Figure 6:
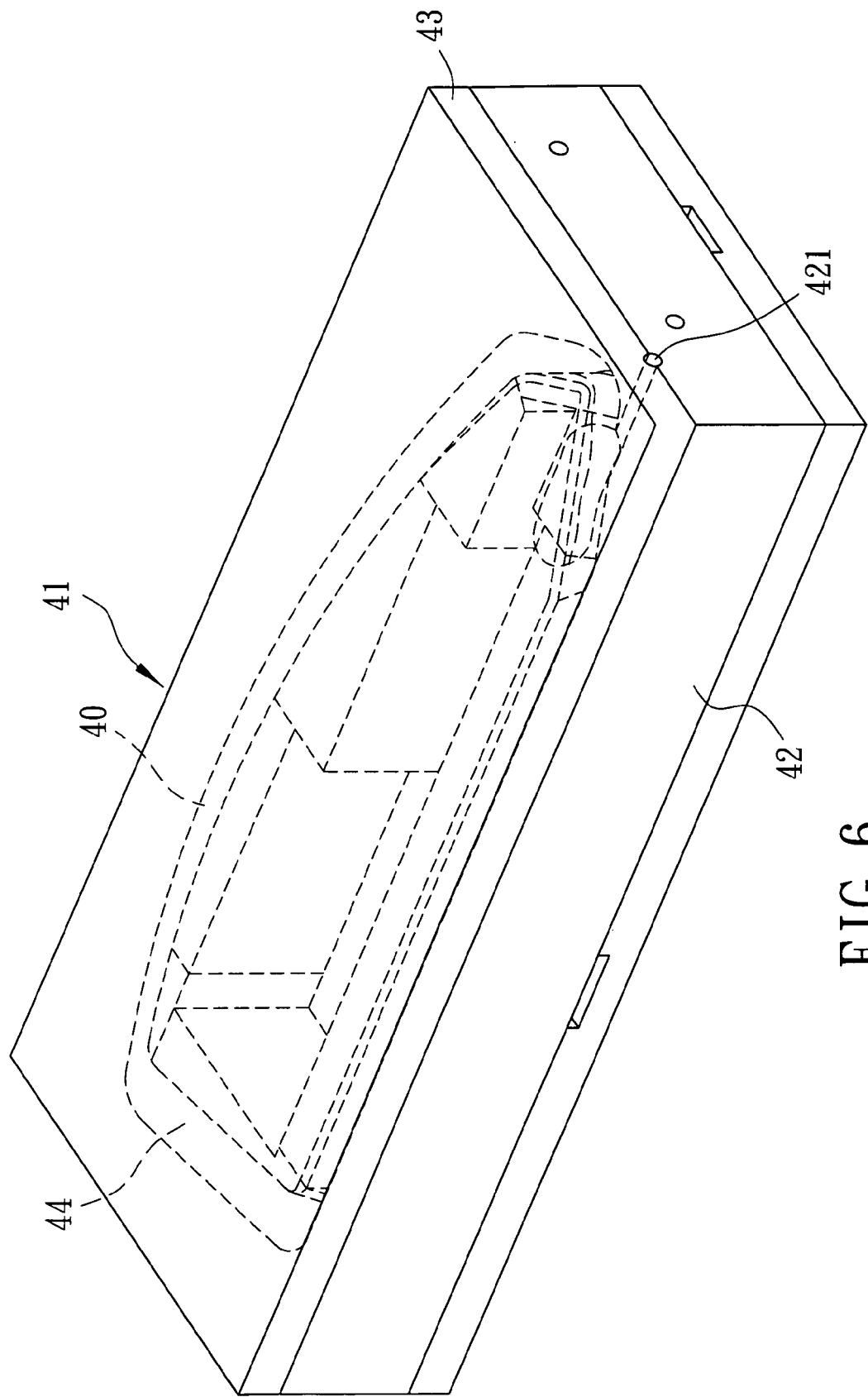
Figure 7:
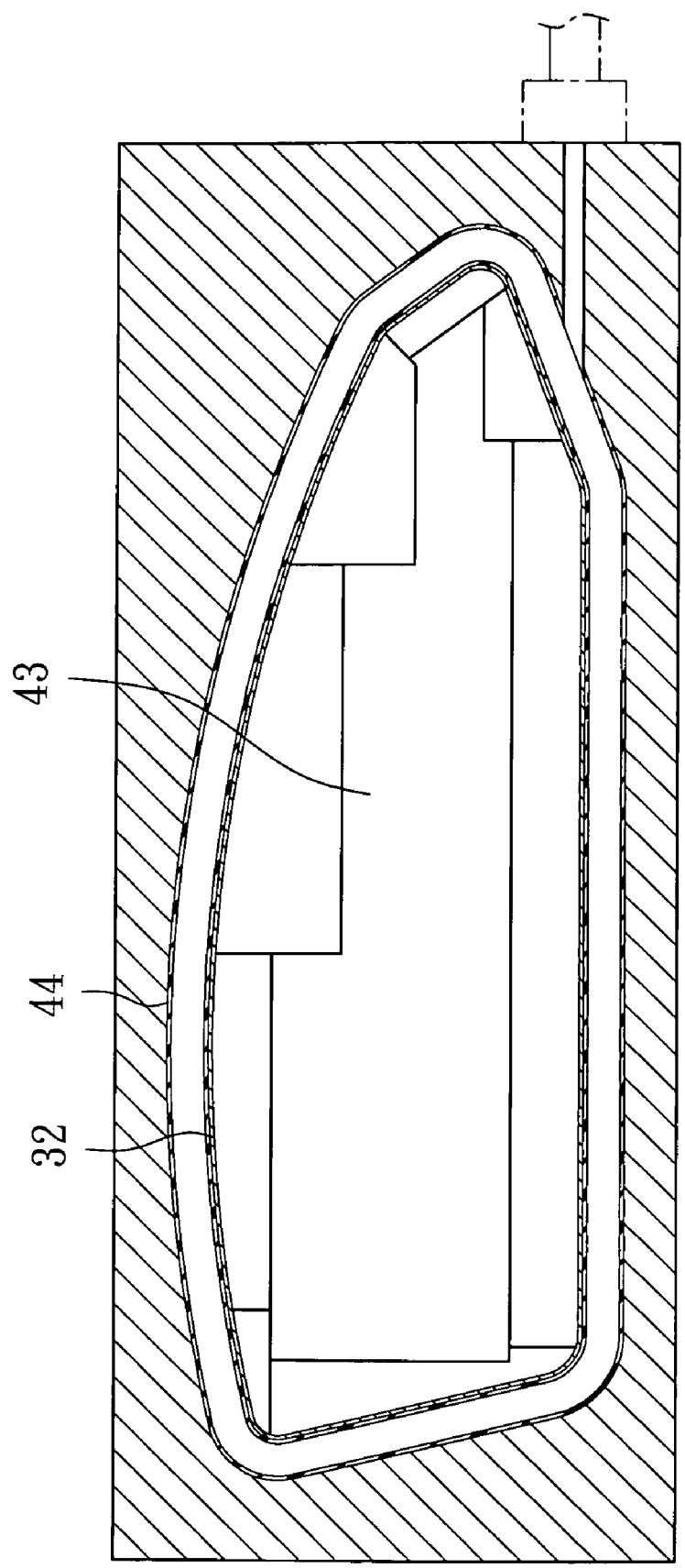
Figure 8:
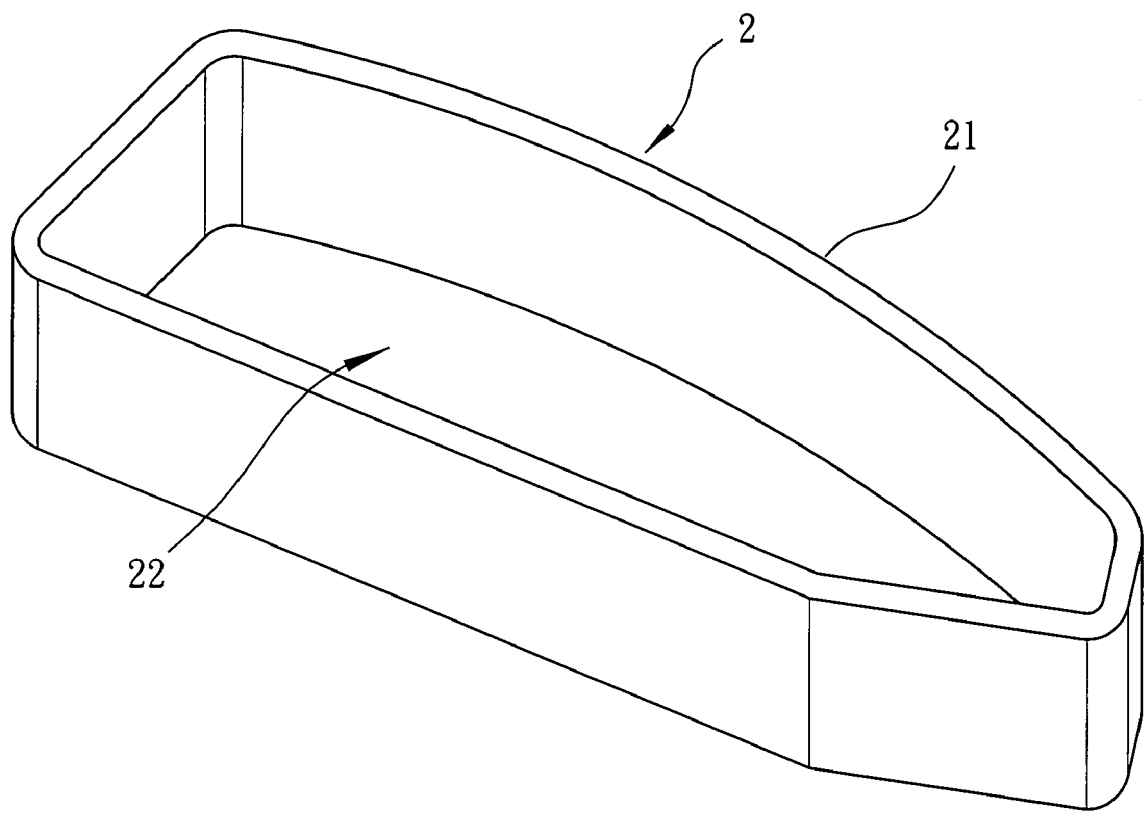

Referring to FIG. 3, the preferred embodiment of a method of making an armrest according to this invention includes the steps of:

A) forming two receptacle parts:

Referring to FIGS. 3 to 8, the receptacle parts 2 are formed separately by molding a prepreg 32 in a first mold assembly 41. Each of the receptacle parts 2 has a looped wall 21 surrounding the slot 22.

The first mold assembly 41 includes a male mold part 43, a female mold part 42, and a core mold 31 having a joint hole 33. The core mold 31 is composed of a plurality of core blocks 311 which surround the joint hole 33 and which are engaged with each other using pins 312. The male mold part 43 is provided with an insert block (not shown) projecting therefrom. The forming of each of the receptacle parts 2 in the first mold assembly 41 includes the steps of:

A1) laying sheets of the prepreg 32:

The sheets of the prepreg 32 of carbon fiber material are laid on surfaces of the core mold 31. The openings 24 of each of the receptacle parts 2 to be formed are provided by cutting the prepreg 32 at proper positions.

A2) placing the core mold 31:

The core mold 31 covered with the prepreg 32 is placed into the female mold part 42 so that a looped receiving space 40 is formed around the core mold 31 within the female mold part 42.

A3) covering the female mold part 42:

The female mold part 42 is covered with the male mold part 43, and the male mold part 43 is engaged with the joint hole 33 by inserting the insert block into the joint hole 33 so as to close the looped receiving space 40.

A4) inserting a first air bag 44:

The first air bag 44 is inserted through a first injecting hole 421 connected to the receiving space 40.

A5) injecting air:

Air is injected into the first air bag 44, and the first air bag 44 is expanded so that the first air bag 44 presses the prepreg sheets 32 against the surfaces of the core mold 31.

A6) heating the first mold assembly 41:

The first mold assembly 41 is heated while expanding the first air bag 44.

A7) releasing each of the receptacle parts 2:

Each of the receptacle parts 2 is released from the first mold assembly 41 by removing the insert block from the joint hole 33, followed by separating the male mold part 43 from the female mold part 42 and disassembling the core blocks 311.

Figure 9:
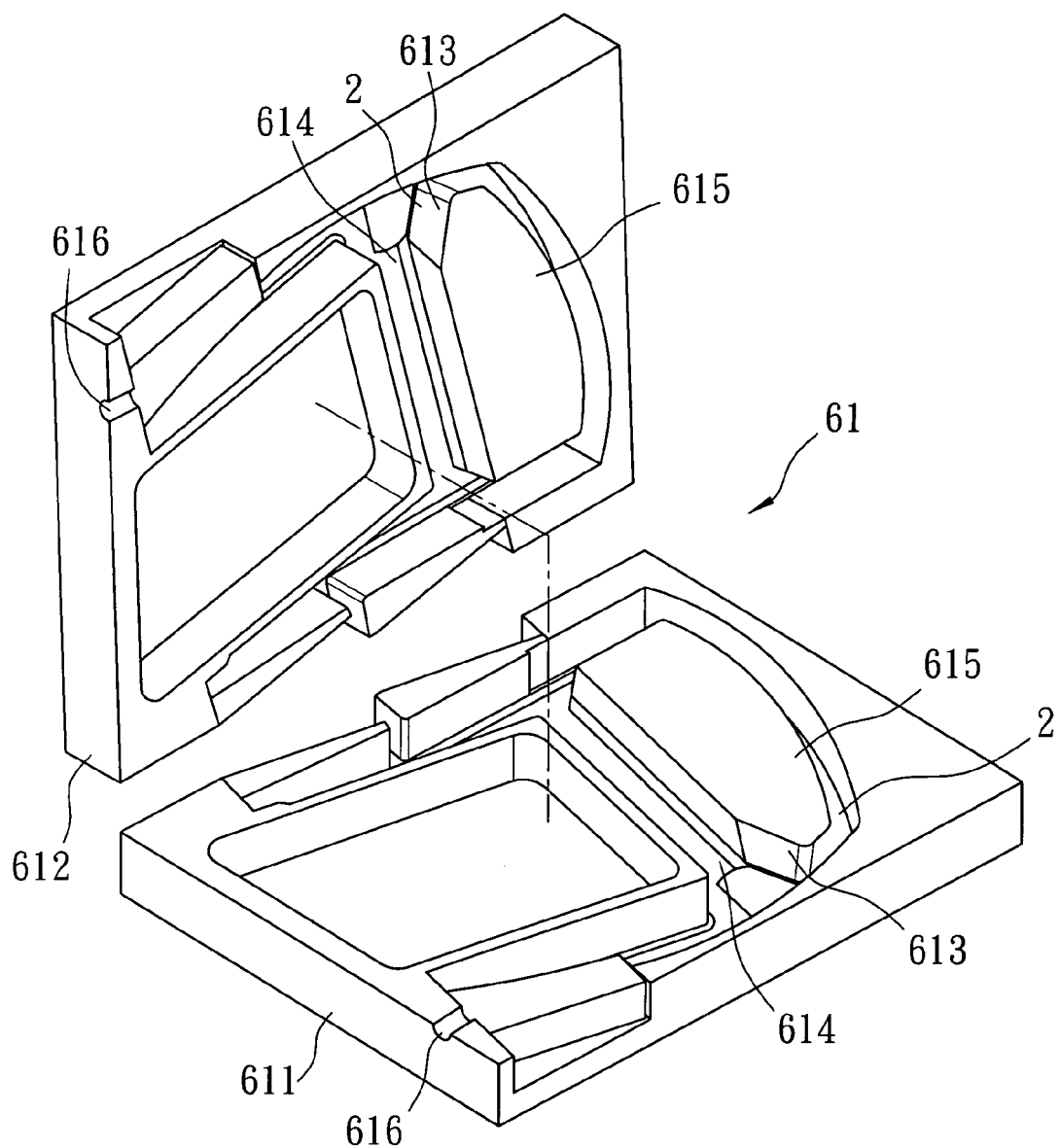
Figure 10:
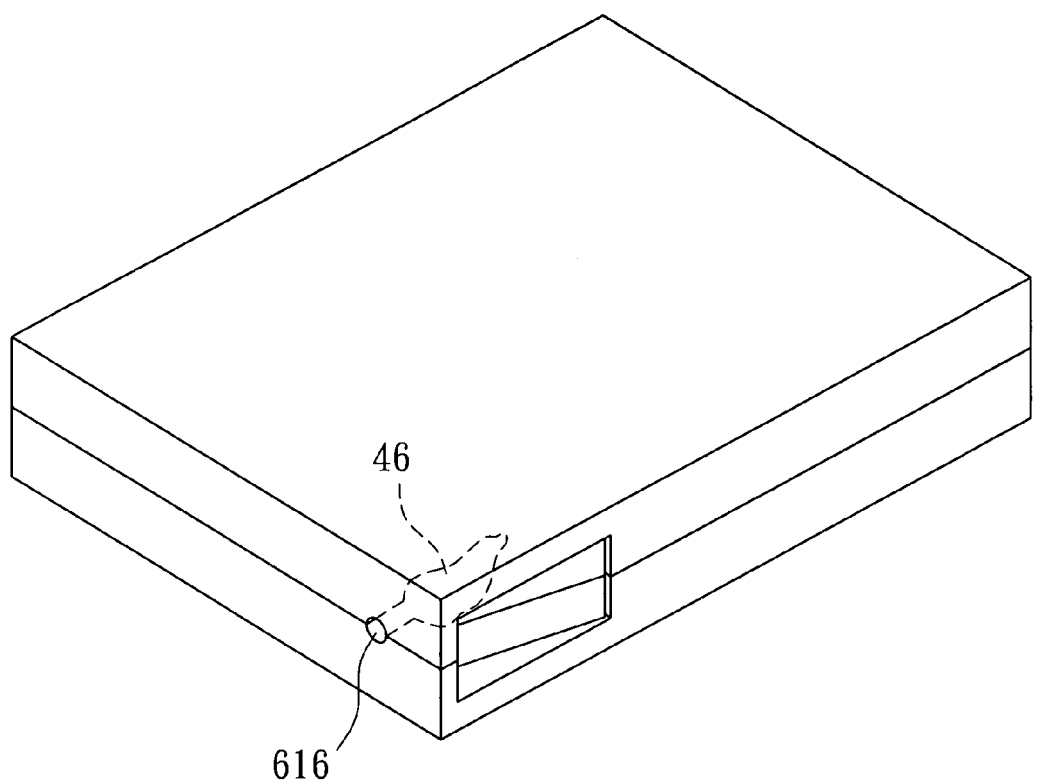
Figure 11:
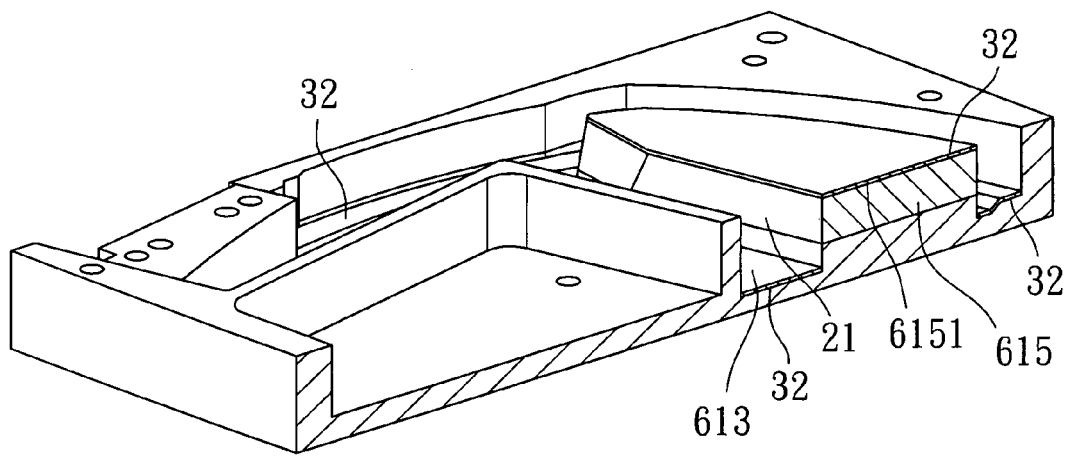

B) forming an armrest frame:

Referring to FIGS. 9 to 11, the armrest frame 1 is formed by molding the prepreg 32 in a second mold assembly 61. As described above, the armrest frame 1 includes a lower frame portion 11 having a plurality of downwardly extending legs 111, and an upper frame portion 12 disposed on top of and bridging the legs 111.

The receptacle parts 2 are positioned within the second mold assembly 61 and are combined with the upper frame portion 12 during the forming of the armrest frame 1 in the second mold assembly 61, thereby providing a one-piece unitary structure having the receptacle parts 2 and the armrest frame 1.

The second mold assembly 61 includes first and second mold halves 611, 612 each of which has a first cavity section 613 to form a half of the upper frame portion 12, and a second cavity section 614 to form a half of the lower frame portion 11. The forming of the armrest frame 1 in the second mold assembly 61 includes the steps of:

B1) positioning the receptacle parts 2:

As best shown in FIG. 11, the receptacle parts 2 are positioned within the first cavity sections 613 of the first and second mold halves 611, 612, respectively. Specifically, each of the first and second mold halves 611, 612 further has a positioning protrusion 615 extending into the corresponding first cavity section 613. The looped wall 21 of each of the receptacle parts 2 is sleeved around the corresponding positioning protrusion 615 so as to be positioned within the corresponding first cavity section 613.

B2) laying sheets of the prepreg 32:

The sheets of prepreg 32 are laid on surfaces of the first and second mold halves 611, 612 defining the first and second cavity sections 613, 614, and on end faces 6151 of the positioning protrusions 615 which are transverse to the looped walls 21.

B3) closing the first and second cavity sections 613, 614:

The first and second mold halves 611, 612 are brought together to close the first and second cavity sections 613, 614. The end faces 6151 of the positioning protrusions 615 are moved close to each other so that the prepreg sheets 32 are pressed on the end faces 6151 when the first and second mold halves 611, 612 are brought together.

B4) expanding a second air bag 46:

The second air bag 46 is expanded within the first and second cavity sections 613, 614 by injecting air into the second air bag 46 through a second injecting hole 616 so that the prepreg sheets 32 are pressed tightly against the surfaces of the first and second mold halves 611, 612.

B5) heating the first and second mold halves 611, 612:

The first and second mold halves 611, 612 are heated while expanding the second air bag 46. The prepreg sheets 32 on the end faces 6151 of the positioning protrusions 615 are formed into a partition plate 121 (see FIG. 1) which partitions the looped walls 21 of the receptacle parts 2.

In view of the aforesaid, the armrest having a relatively complicated configuration can be made by the method of the present invention so as to provide a one-piece unitary structure for the armrest. Therefore, the armrest made by the method of the present invention has an improved mechanical strength.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method of making an armrest that is mountable between adjacent left and right passenger seats, comprising:

providing two receptacle parts by molding a prepreg under heat in a first mold assembly to form each of the receptacle parts, the receptacle parts being adapted to have a plurality of recesses for holding personal objects, and each receptacle part having a looped wall surrounding a slot;

forming an armrest frame by molding a prepreg under heat in a second mold assembly, the armrest frame including a lower frame portion having a plurality of downwardly extending legs, and an upper frame portion disposed on top of and bridging the legs; and positioning the receptacle parts within the second mold assembly before the armrest frame is formed in the second mold assembly, wherein the receptacle parts are incorporated into the upper frame portion of the armrest frame after the armrest frame is formed, thereby providing a one-piece unitary structure having the receptacle parts and the armrest frame.

2. The method as claimed in claim 1, wherein the first mold assembly includes a male mold part, a female mold part, and a core mold having a joint hole, and wherein the forming of each of the receptacle parts in the first mold assembly includes:

laying sheets of the prepreg on surfaces of the core mold;

placing the core mold into the female mold part so that a looped receiving space is formed around the core mold within the female mold part;

covering the female mold part with the male mold part and engaging the male mold part with the joint hole, thereby closing the looped receiving space;

inserting a first air bag through a first injecting hole connected to the looped receiving space;

injecting air into and expanding the first air bag so that the first air bag presses the sheets of the prepreg against the surfaces of the core mold; and heating the first mold assembly while expanding the first air bag.

3. The method as claimed in claim 2, wherein the core mold is composed of a plurality of core blocks which surround the joint hole, and wherein the male mold part is provided with an insert block projecting therefrom and is engaged with the joint hole by inserting the insert block into the joint hole.

4. The method as claimed in claim 3, further comprising releasing each of the receptacle parts from the first mold assembly by removing the insert block from the joint hole, followed by separating the male mold part from the female mold part and disassembling the core blocks.

5. The method as claimed claim 1, wherein the second mold assembly includes first and second mold halves each of which has a first cavity section to form a half of the upper frame portion, and a second cavity section to form a half of the lower frame portion, and wherein the forming of the armrest frame in the second mold assembly includes:

positioning the receptacle parts within the first cavity sections of the first and second mold halves, respectively;

laying sheets of the prepreg on surfaces of the first and second mold halves defining the first and second cavity sections;

bringing together the first and second mold halves to close the first and second cavity sections;

expanding a second air bag within the first and second cavity sections so that the sheets of the prepreg are pressed tightly against the surfaces of the first and second mold halves; and heating the first and second mold halves while expanding the second air bag.

6. The method as claimed in claim 5, wherein each of the first and second mold halves further has a positioning protrusion extending into the corresponding first cavity section, and wherein the looped wall of each of the receptacle parts is sleeved around the corresponding positioning protrusion so as to be positioned within the corresponding first cavity section.

7. The method as claimed in claim 6, further comprising:

laying other sheets of the prepreg on end faces of the positioning protrusions which are transverse to the looped walls; and causing the end faces of the positioning protrusions to move close to each other and to press the other sheets of the prepreg on the end faces when the first and second mold halves are brought together;

wherein the other sheets of the prepreg on the end faces of the positioning protrusions are formed into a partition plate which partitions the looped walls of the receptacle parts.

\* \* \* \* \*